(12) United States Patent
Balu et al.

(10) Patent No.: US 12,276,950 B2
(45) Date of Patent: Apr. 15, 2025

(54) INTELLIGENT RESOURCE EVALUATOR SYSTEM FOR ROBOTIC PROCESS AUTOMATIONS

(71) Applicant: Bank of America Corporation, Charlotte, NC (US)

(72) Inventors: Sudhakar Balu, Chennai (IN); Sri Lakshmi Priya Doraiswamy, Charlotte, NC (US); Siva Kumar Paini, Telangana (IN); Nagalaxmi Sama, Telangana (IN); Sathya Thamilarasan, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 487 days.

(21) Appl. No.: 17/848,669

(22) Filed: Jun. 24, 2022

(65) Prior Publication Data
US 2023/0418242 A1 Dec. 28, 2023

(51) Int. Cl.
*G05B 13/02* (2006.01)
*G06F 9/50* (2006.01)

(52) U.S. Cl.
CPC ....... *G05B 13/0265* (2013.01); *G06F 9/5027* (2013.01); *G06F 2209/501* (2013.01); *G06F 2209/5019* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 10,270,644 B1 * | 4/2019 | Valsecchi | G06N 5/04 |
| 10,901,787 B2 * | 1/2021 | Kaul | G06F 9/5055 |
| 11,190,643 B1 * | 11/2021 | Sanghvi | G06Q 30/016 |
| 11,195,078 B1 | 12/2021 | Wong et al. | |
| 11,200,539 B2 | 12/2021 | Iyer et al. | |
| 11,233,861 B2 | 1/2022 | Hall et al. | |
| 11,243,803 B2 | 2/2022 | Anand et al. | |
| 11,244,233 B2 | 2/2022 | Sturtivant et al. | |
| 11,249,729 B2 | 2/2022 | Voicu et al. | |
| 11,270,186 B2 | 3/2022 | Voicu et al. | |
| 11,288,064 B1 | 3/2022 | Monakova | |
| 11,288,557 B2 | 3/2022 | Gligan et al. | |
| 11,294,793 B1 | 4/2022 | Stan | |
| 11,301,224 B1 | 4/2022 | Dabhi et al. | |
| 11,314,531 B1 | 4/2022 | Mayer et al. | |

(Continued)

*Primary Examiner* — Hiren P Patel
(74) *Attorney, Agent, or Firm* — Banner & Witcoff, Ltd.

(57) ABSTRACT

Aspects of the disclosure relate to an intelligent resource evaluation engine. A computing platform may monitor the plurality of RPA machines to detect parameter information. The computing platform may store the parameter information along with corresponding RPA machines as a key value pairs in a database. The computing platform may identify first current parameter information for a first RPA machine using the key value pairs. The computing platform may input the first current parameter information into an intelligent resource evaluation model, which may output first machine selection information for the first RPA machine. Based on identifying that the first RPA machine is sufficient to execute the first robotic automation process, the computing platform may send direct the first RPA machine to execute the first robotic automation process.

16 Claims, 10 Drawing Sheets

(56) References Cited

U.S. PATENT DOCUMENTS

| | | | |
|---|---|---|---|
| 11,321,124 B2 | 5/2022 | Madkour | |
| 11,325,254 B2 | 5/2022 | Hall | |
| 11,334,465 B2 | 5/2022 | Kadakia et al. | |
| 11,334,471 B1 | 5/2022 | Stocker et al. | |
| 11,334,828 B2 | 5/2022 | Negulescu | |
| 11,347,613 B2 | 5/2022 | Singh et al. | |
| 11,354,164 B1 | 6/2022 | Dennis et al. | |
| 11,366,644 B1 | 6/2022 | Krebs et al. | |
| 11,449,812 B2* | 9/2022 | Jain | G06Q 10/06312 |
| 11,455,234 B2* | 9/2022 | Ghare | G06F 11/3664 |
| 12,085,901 B2* | 9/2024 | Kothandaraman | H04L 41/5019 |
| 12,093,792 B2* | 9/2024 | Rajagopalan | G06N 20/00 |
| 2012/0198466 A1* | 8/2012 | Cherkasova | G06F 9/5066 |
| | | | 718/104 |
| 2019/0303207 A1* | 10/2019 | Vadapandeshwara | G06F 9/5038 |
| 2021/0365856 A1* | 11/2021 | Mukherjee | G06Q 10/103 |
| 2022/0197249 A1* | 6/2022 | Ma | G06F 9/45558 |
| 2022/0292542 A1* | 9/2022 | Kaspar | G06Q 30/0244 |
| 2022/0300336 A1* | 9/2022 | Major | G06F 9/546 |
| 2022/0413931 A1* | 12/2022 | Chiang | G06F 9/5044 |
| 2022/0414534 A1* | 12/2022 | Ananthanarayanan | G06N 20/00 |
| 2023/0133373 A1* | 5/2023 | McGonnell | G06F 9/451 |
| | | | 706/12 |

* cited by examiner

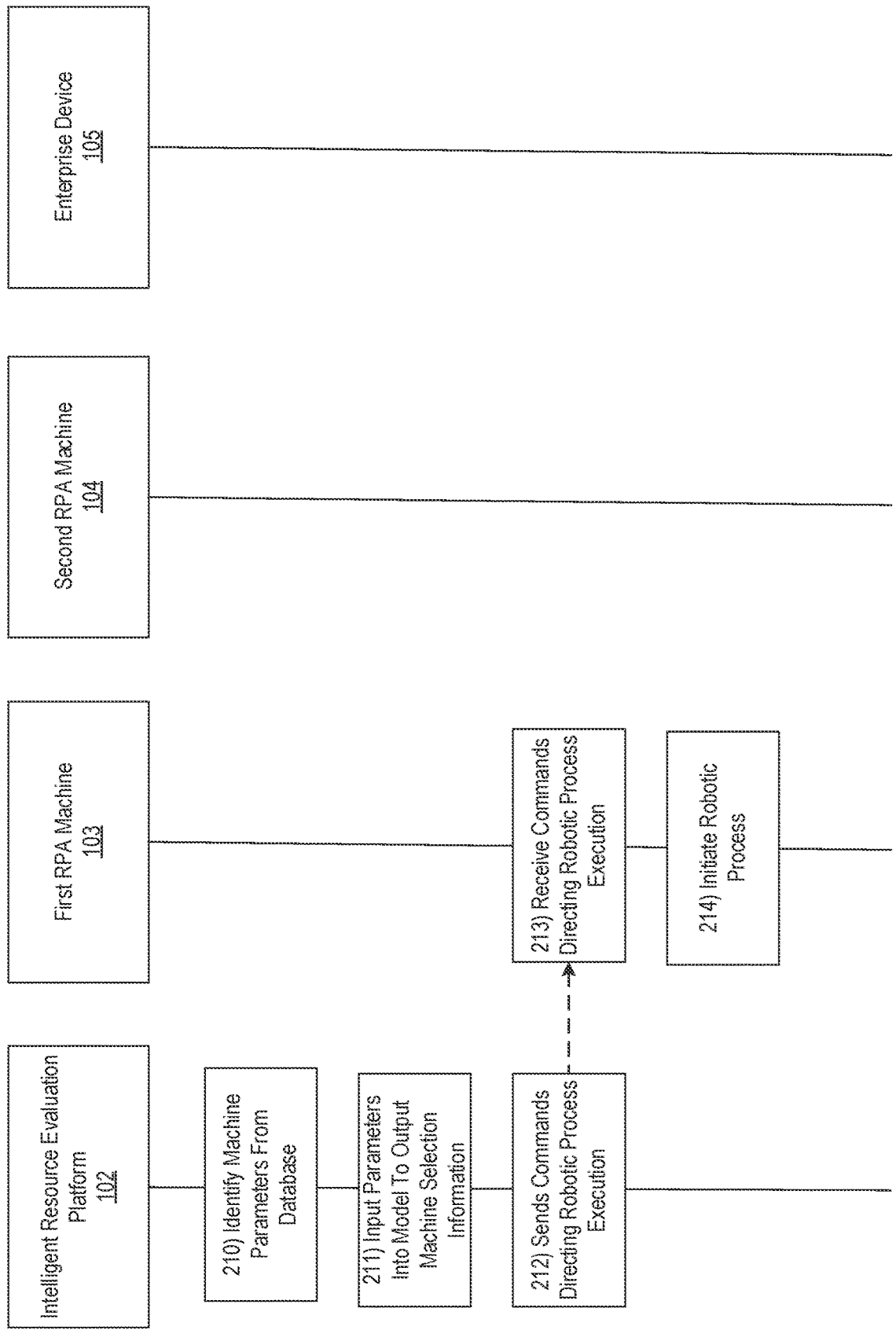

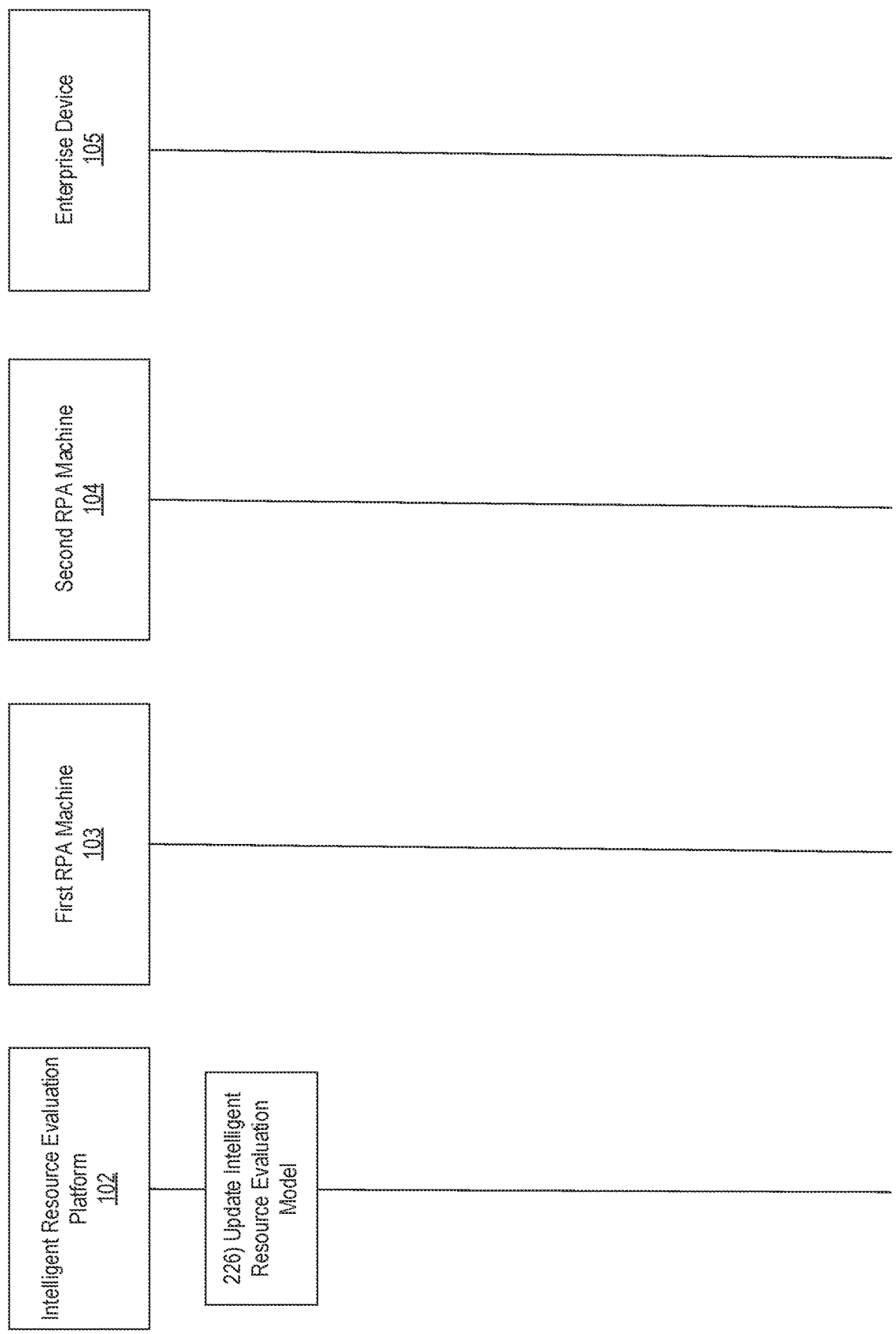

INTELLIGENT RESOURCE EVALUATOR SYSTEM FOR ROBOTIC PROCESS AUTOMATIONS

BACKGROUND

Aspects of the disclosure relate to robotic process automations. In some instances, bots may establish connections with machines to complete steps of such robotic process automations. There may, however, be instances where the bot may execute slower than expected or fail in the machine, such as instances where a workflow involves downloading/uploading large files or executing complex functions. It may be important to prevent or otherwise reduce likelihood of such failures.

SUMMARY

Aspects of the disclosure provide effective, efficient, scalable, and convenient technical solutions that address and overcome the technical problems associated with intelligent resource evaluation and robotic process automations. In accordance with one or more embodiments of the disclosure, a computing platform comprising at least one processor, a communication interface, and memory storing computer-readable instructions may train, using historical parameter information corresponding to a plurality of robotic process automation (RPA) machines and corresponding servers, an intelligent resource evaluation model, which may configure the intelligent resource evaluation model to output machine selection information indicating whether a given RPA machine is sufficient or insufficient for executing a given process automation. The computing platform may monitor the plurality of RPA machines to detect current parameter information. The computing platform may store the current parameter information along with the corresponding RPA machines as key value pairs in a database. The computing platform may identify a first RPA machine for use in executing a first robotic automation process. The computing platform may identify first current parameter information for the first RPA machine using the key value pairs. The computing platform may input the first current parameter information into the intelligent resource evaluation model, which may cause the intelligent resource evaluation model to output first machine selection information for the first RPA machine. Based on identifying that the first RPA machine is sufficient to execute the first robotic automation process, the computing platform may send one or more commands directing the first RPA machine to execute the first robotic automation process, which may cause the first RPA machine to execute the first robotic automation process.

In one or more instances, training the intelligent resource evaluation model may include labelling historical server and machine parameters to indicate whether or not various robotic automation processes have successfully executed when the corresponding parameters are present, and labelling the historical server and machine parameters results in the historical parameter information. In one or more instances, the historical parameter information and the current parameter information may include one or more of: server parameter information or machine parameter information, where: 1) the server parameter information may be server availability, environmental information, database information, connectivity issues, server performance, application programming interface (API) connects, and/or other information, and 2) the machine parameter information may include machine identifiers, computer processing unit (CPU) utilization, response time, network latency, memory utilization, background processes, and/or other information.

In one or more examples, storing the current parameter information along with the corresponding RPA machines as the key value pairs in the database may include: 1) defining each RPA machine and each server as a key, 2) storing each key in a unique row of the database, and 3) storing, in the unique rows for each key, the current parameter information for the corresponding RPA machine or server, where each column of the database may correspond to a type of parameter information, and each value of the current parameter information may be uniquely stored based on: its corresponding type of parameter information, and its corresponding RPA machine or server. In one or more examples, training the intelligent resource evaluation model may cause the intelligent resource evaluation model to establish, for each of a plurality of parameter types and each of a plurality of process automations, a selection threshold, where a machine may be deemed insufficient for a given process automation if a corresponding parameter value falls below the selection threshold for the given process automation.

In one or more instances, identifying the first current parameter information for the first RPA machine using the key value pairs may include: 1) indexing an identifier for the first RPA machine to identify the corresponding key, and 2) identifying, based on a row of the database for the corresponding key, the first current parameter information. In one or more instances, based on identifying an error during execution of the first robotic automation process, the computing platform may send one or more commands directing the first RPA machine to terminate the first robotic automation process, which may cause the first RPA machine to terminate the first robotic automation process.

In one or more examples, terminating the first robotic automation process may include terminating, at a logical breakpoint indicated in the one or more commands directing the first RPA machine to terminate the first robotic automation process, the first robotic automation process. In one or more examples, the computing platform may identify, based on process logs for the first robotic automation process, the logical breakpoint. In one or more examples, storing the current parameter information along with the corresponding RPA machines may include: 1) performing a feature engineering process to identify one or more information types of the current parameter information to be input into the intelligent resource evaluation model, and 2) storing a portion of the current parameter information corresponding to the identified one or more information types. In one or more examples, based on identifying that the first RPA machine is not sufficient to execute the first robotic automation process, the computing platform may identify a second RPA machine for use in executing the first robotic automation process These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for intelligent resource evaluation for robotic process automations in accordance with one or more example embodiments;

DETAILED DESCRIPTION

Figure 1A:
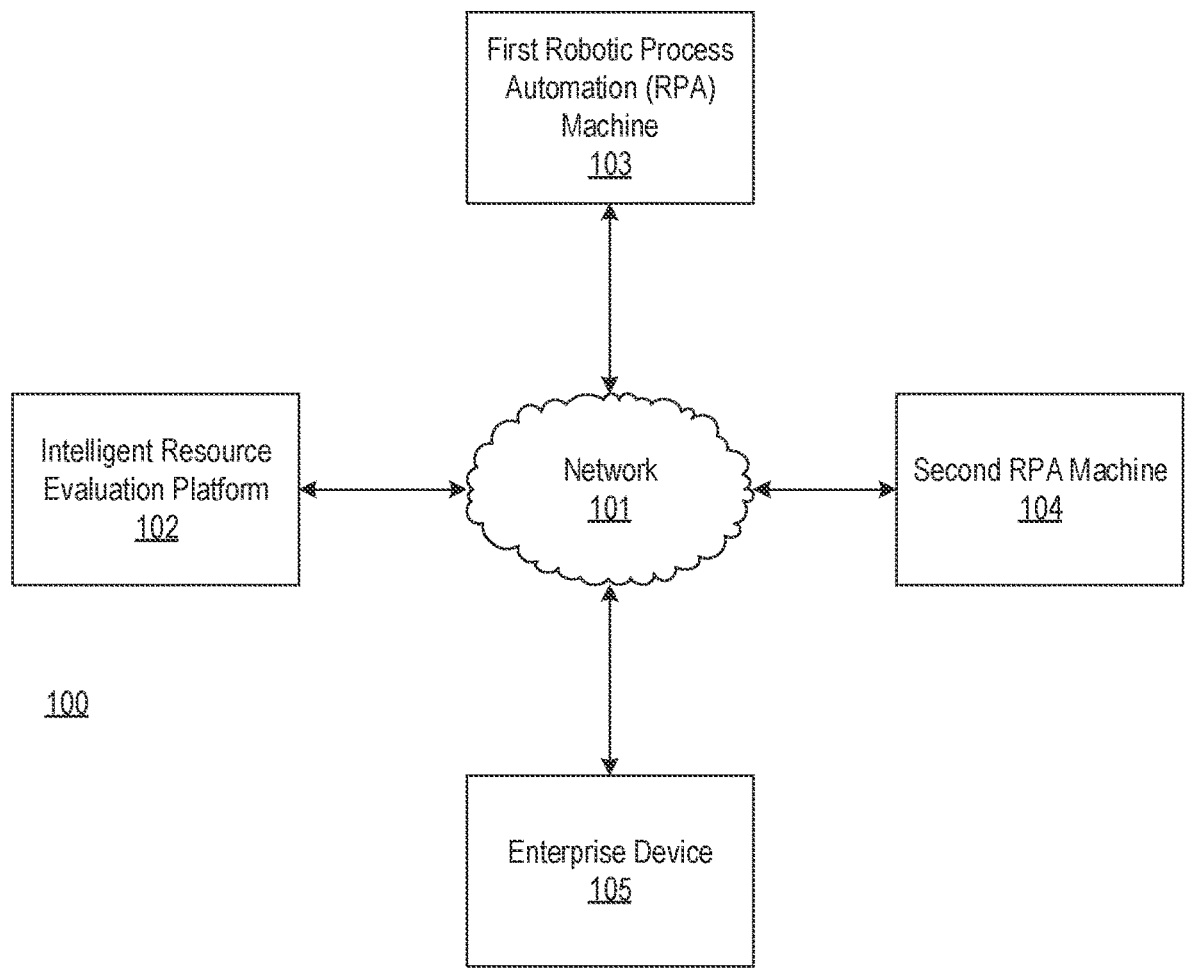
FIGS. 1A-1B depict an illustrative computing environment for intelligent resource evaluation for robotic process automations in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure are directed to an intelligent resource evaluator system for robotic automation processes. More specifically, robotic automation processes may be scheduled to run in any allocated machine. Typically, a bot may establish a connection with the machine to complete a series of steps per the automation workflow design. There may be times where the bot executes slower than expected or fails in the machine (e.g., when the workflow involves downloading/uploading large files or executing complex functions). This may be due to network bandwidth, application server issues, disk capacity/memory issues, multiple system background processes executing in the machine, and/or other reasons.

Accordingly, described herein is a self-learning intelligent resource evaluator computing system, which is developed to capture and analyze the resource utilization in robotic process automation (RPA) machines. A dynamic computing system may check for network bandwidth, disk capacity/memory issues, unknown background processes executing in a machine, and/or other issues that may slow down performance. Additionally, the dynamic computing system may connect with various application servers and may check availability and/or other performance of the server before the bot execution starts. Resource utilization may also be dynamically monitored while the bot is running. The dynamic computing system may capture all the necessary metadata, and may pass it to a data wrangling process to transform the raw data into an appropriate format for analysis. The organized metadata may be stored in a column family database by grouping the related data about the machine and/or server resources. The resulting object may be a tuple made up of a key-value pair, where the key may be linked to a value, and the value may be a set of columns. For every recursive run, the system may capture the metadata and may compare it with the respective bot's average threshold value in the database to determine if it fails, meets, or exceeds the threshold. An event stream engine may be capable of connecting with multiple machines in parallel and may instruct the actual bot to start or pause at logical breakpoints to minimize bot failures.

Accordingly, an intelligent dynamic computing system may capture and analyze various parameters such as network bandwidth, application server resources, disk capacity/memory, CPU utilization resources, background processes executing in the machine, data availability, and/or connectivity before the bot executes in any machine, and may smartly execute random checks of resource utilization while the bot is executing. The system may alert the bot to start, stop, or pause at logical breakpoints to avoid any failures, which may be beyond the usual scope for any robotic automation solutions.

The system may be a recursive model capturing success and failure scenarios from every run, and building smart threshold values for system parameters. By storing the metadata in the column family database with keys mapped to values and the values grouped into multiple column families, faster access to system parameters and real time checks may be performed without impacting bot performance. By logging both success and failure scenarios from every run, the system may perform self-learning as well as efficient output estimation. The event stream engine may be capable of connecting with multiple machines in parallel, and instructing the actual bot when to start, stop, or pause, at logical breakpoints intelligently through workflow recordings or logs. This method may be applied on an existing or new robotic automation solutions to handle unexpected system or performance issues. Furthermore, a self-services customization option may allow resource parameters to be specified for each bot.

Figure 1B:
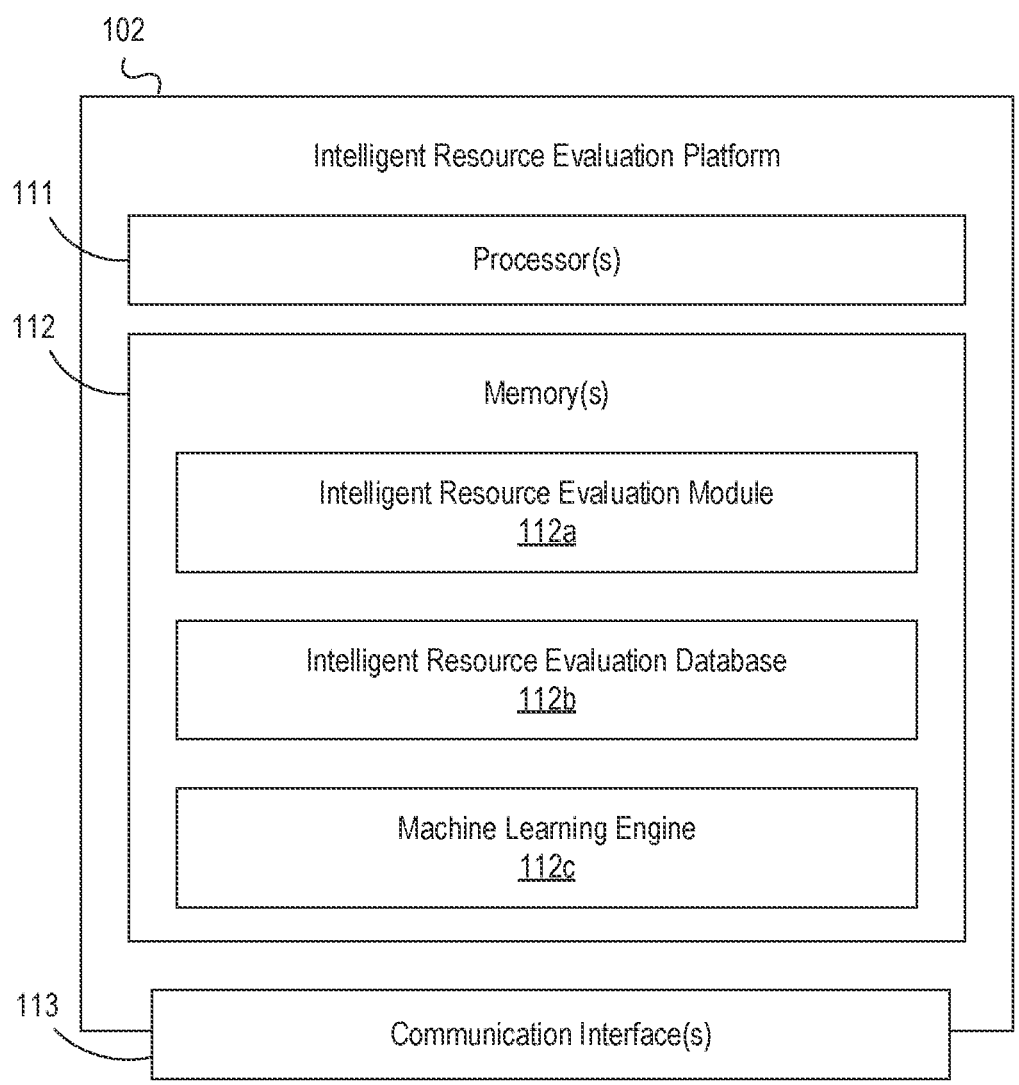

FIGS. 1A-1B depict an illustrative computing environment for intelligent resource evaluation for robotic process automations in accordance with one or more example embodiments. Referring to FIG. 1A, computing environment 100 may include one or more computer systems. For example, computing environment 100 may include an intelligent resource evaluation platform 102, a first robotic process automation (RPA) machine 103, a second RPA machine 104, and an enterprise device 105.

As described further below, intelligent resource evaluation platform 102 may be a computer system that includes one or more computing devices (e.g., servers, server blades, or the like) and/or other computer components (e.g., processors, memories, communication interfaces) that may be configured to evaluate RPA machines and/or servers for execution of robotic process automations. To do so, in some instances, the intelligent resource evaluation platform 102 may be configured to train, host, and/or otherwise maintain a machine learning model, configured to output an indication of whether or not a particular machine/server is sufficient or insufficient for processing based on current parameters of the machine/server. In some instances, the intelligent resource evaluation platform 102 may also be configured to analyze data logs for various robotic process automations to identify logical breakpoints for the given automations in the event of an error.

First RPA machine 103 may include one or more computing devices (e.g., servers, server blades, or the like) and/or other computer components (e.g., processors, memories, communication interfaces) that may be used to execute robotic process automations. In some instances, the first RPA machine 103 may be configured to terminate a robotic process automation at a logical breakpoint based on identification of an error. In some instances, first RPA machine 103 may be hosted or otherwise supported by one or more servers.

Second RPA machine 104 may include one or more computing devices (e.g., servers, server blades, or the like)

and/or other computer components (e.g., processors, memories, communication interfaces) that may be used to execute robotic process automations. In some instances, the second RPA machine 104 may be configured to terminate a robotic process automation at a logical breakpoint based on identification of an error. In some instances, second RPA machine 104 may be hosted or otherwise supported by one or more servers.

In some instances, the intelligent resource evaluation platform 102, first RPA machine 103, and/or second RPA machine 104 may be integrated into a common bot system or platform. In other instances, the intelligent resource evaluation platform 102, first RPA machine 103, and/or second RPA machine 104 may be separate systems.

Enterprise device 105 may be a laptop computer, desktop computer, mobile device, tablet, smartphone, or the like that may be used by an employee of an enterprise organization (e.g., a financial institution, or the like). For example, the enterprise device 105 may be used to perform feature engineering for the intelligent resource evaluation model. In some instances, enterprise device 105 may be configured to display one or more user interfaces (e.g., error notifications, process completion notifications, and/or other interfaces).

Although FIG. 1A depicts two RPA machines 103, 104 and a single enterprise device 105, any number of RPA machines and/or enterprise devices may implement the methods described herein without departing from the scope of the disclosure. Similarly, any number of intelligent resource evaluation platforms 102 may be implemented (e.g., one in each bot, one per group of bots, one total, and/or otherwise) without departing from the scope of the disclosure.

Computing environment 100 also may include one or more networks, which may interconnect intelligent resource evaluation platform 102, first RPA machine 103, second RPA machine 104, and/or enterprise device 105. For example, computing environment 100 may include a network 101 (which may interconnect, e.g., intelligent resource evaluation platform 102, first RPA machine 103, second RPA machine 104, and/or enterprise device 105).

In one or more arrangements, intelligent resource evaluation platform 102, first RPA machine 103, second RPA machine 104, and/or enterprise device 105 may be any type of computing device capable of sending and/or receiving requests and processing the requests accordingly. For example, intelligent resource evaluation platform 102, first RPA machine 103, second RPA machine 104, enterprise device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of intelligent resource evaluation platform 102, first RPA machine 103, second RPA machine 104, and/or enterprise device 105, may, in some instances, be special-purpose computing devices configured to perform specific functions.

Referring to FIG. 1B, intelligent resource evaluation platform 102 may include one or more processors 111, memory 112, and communication interface 113. A data bus may interconnect processor 111, memory 112, and communication interface 113. Communication interface 113 may be a network interface configured to support communication between intelligent resource evaluation platform 102 and one or more networks (e.g., network 101, or the like). Memory 112 may include one or more program modules having instructions that when executed by processor 111 cause intelligent resource evaluation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of intelligent resource evaluation platform 102 and/or by different computing devices that may form and/or otherwise make up intelligent resource evaluation platform 102. For example, memory 112 may have, host, store, and/or include intelligent resource evaluation module 112a, intelligent resource evaluation database 112b, and machine learning engine 112c.

Intelligent resource evaluation module 112a may have instructions that direct and/or cause intelligent resource evaluation platform 102 to execute advanced resource evaluation and process termination techniques. Intelligent resource evaluation database 112b may store information used by intelligent resource evaluation module 112a and/or intelligent resource evaluation platform 102 in application of resource evaluation, process termination, and/or in performing other functions. Machine learning engine 112c may have instructions that direct and/or cause the intelligent resource evaluation platform 102 to set, define, and/or iteratively refine optimization rules and/or other parameters used by the intelligent resource evaluation platform 102 and/or other systems in computing environment 100.

Figure 2A:
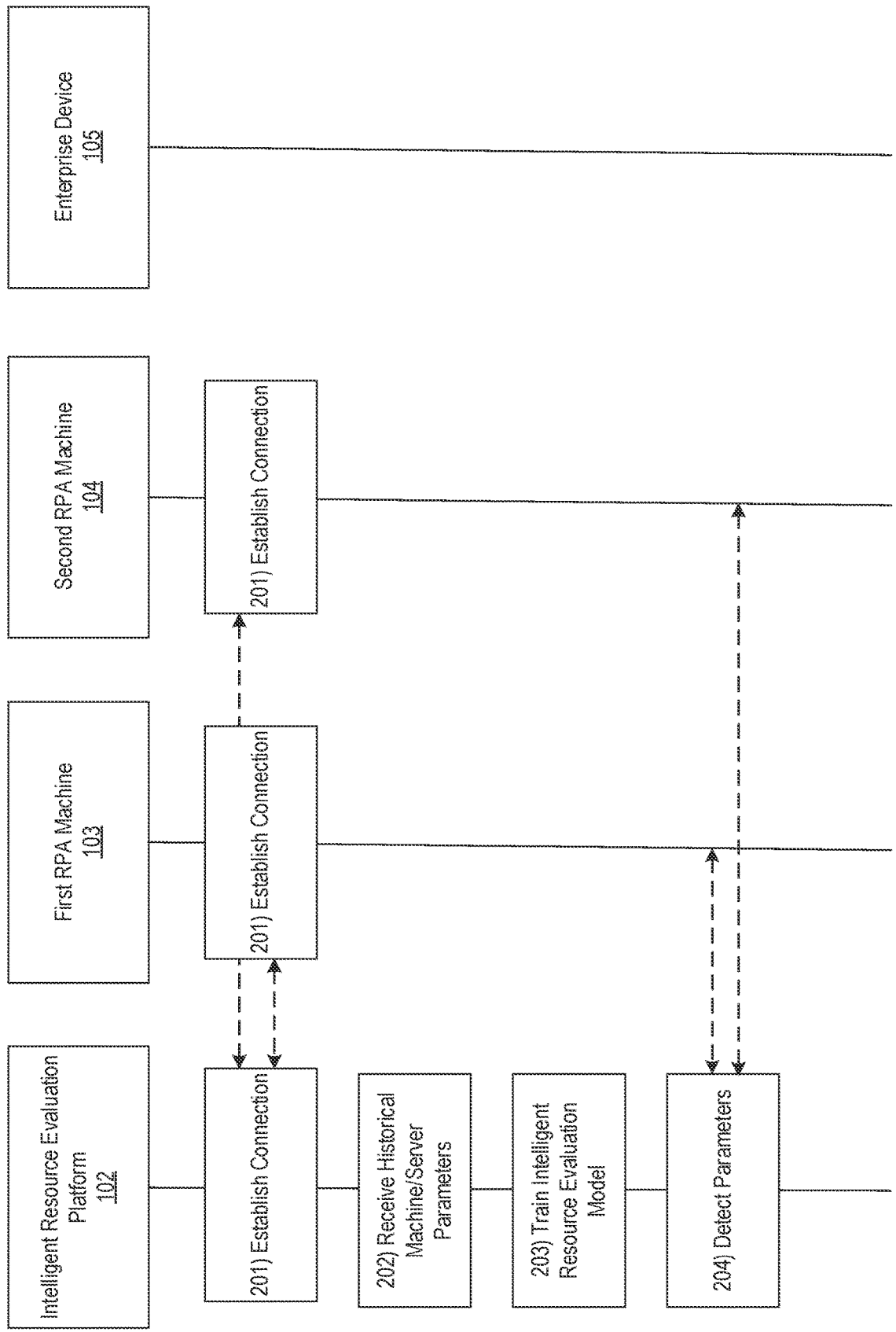

FIGS. 2A-2F depict an illustrative event sequence for intelligent resource evaluation for robotic process automations in accordance with one or more example embodiments. Referring to FIG. 2A, at step 201, the intelligent resource evaluation platform 102 may establish a connection with the first RPA machine 103, second RPA machine 104, and/or other RPA machines/servers. For example, the intelligent resource evaluation platform 102 may establish a first and/or second wireless data connection with the first RPA machine 103 and/or second RPA machine 104 to link the intelligent resource evaluation platform 102 to the first RPA machine 103 and/or second RPA machine 104 (e.g., in preparation for obtaining historical machine and/or server parameters). In some instances, the intelligent resource evaluation platform 102 may identify whether connections are already established with the first RPA machine 103 and/or second RPA machine 104. If connections are already established, the intelligent resource evaluation platform 102 might not re-establish the connection. If connections are not yet established, the intelligent resource evaluation platform 102 may establish the first and/or second wireless data connections are established.

At step 202, the intelligent resource evaluation platform 102 may monitor the first RPA machine 103, second RPA machine 104, and/or other RPA machines to identify historical machine and/or server parameters. For example, the intelligent resource evaluation platform 102 may collect metadata for the various RPA machines (e.g., machine identifiers, computer processing unit (CPU) utilization, response time, network latency, memory utilization, background processes, and/or other information) and/or servers (e.g., availability information, environmental information, database information, connectivity issues, server performance, application programming interface (API) connects, and/or other information).

At step 203, the intelligent resource evaluation platform 102 may train an intelligent resource evaluation model using the historical parameters. For example, the intelligent resource evaluation platform 102 may input labelled data into the intelligent resource evaluation model, so as to train the intelligent resource evaluation model (e.g., using one or more supervised learning techniques) to output whether or not a particular RPA machine is sufficient for executing a robotic process automation. Specifically, each historical parameter may be labelled with a corresponding robotic process automation that was performed, and whether or not the automation was successful. The intelligent resource evaluation model may process this information so as to identify threshold values, for each parameter, for each type of robotic process automation (e.g., different threshold values for a first robotic process automation than for a second robotic process automation).

As a specific example, the intelligent resource evaluation platform 102 may set a threshold indicating that robotic process automations for a given machine identifier should be successful over 90% of the time—if a particular machine meets this threshold, it may be deemed sufficient, otherwise it may be deemed insufficient. Similarly, as another example, the intelligent resource evaluation platform 102 may identify that if server availability drops below 30%, robotic process automations fail 90% of the time. Accordingly, the intelligent resource evaluation platform 102 may set a threshold indicating that if server availability drops below 30%, the corresponding server/machines may be deemed insufficient, and otherwise the corresponding servers/machine may be deemed sufficient. In some instances, these thresholds may be automatically set by the intelligent resource evaluation platform 102. Additionally or alternatively, thresholds may be manually defined.

The intelligent resource evaluation platform 102 may in some instances train the intelligent resource evaluation model to perform a holistic analysis of the various parameters. For example, the intelligent resource evaluation model may be trained to assign a 1 for every parameter indicating sufficiency and a 0 for every parameter indicating insufficiency. Then, the intelligent resource evaluation model may add the values and divide by a total number of parameters considered. In these instances, if the resulting value is equal to or greater than 0.9, the intelligent resource evaluation platform 102 may deem the corresponding server/machine sufficient to execute a given robotic process automation, or otherwise (e.g., if the resulting value is less than 0.9), the corresponding server/machine may be deemed insufficient. In some instances, the intelligent resource evaluation platform 102 may train the intelligent resource evaluation model to perform a weighted holistic analysis, where certain parameters are weighted more or less than others. For example, if CPU utilization were to be weighted twice as much as the remaining parameters, a value of 2 would be assigned if the CPU meets or exceeds the corresponding threshold for sufficiency, and a value of −1 may be assigned if the CPU does not meet the corresponding threshold. In some instances, the intelligent resource evaluation model may be trained to dynamically adjust any of the thresholds, weighting, and/or other analysis values as additional parameters are received (e.g., continue to train the model in an unsupervised (or supervised) manner). For example, the intelligent resource evaluation model may continuously monitor error rates, and may dynamically increase/decrease thresholds and/or weightings accordingly based on increases or decreases in such error rates.

At step 204, the intelligent resource evaluation platform 102 may detect current parameters for the first RPA machine 103, second RPA machine 104, and/or other RPA machines/servers. For example, the intelligent resource evaluation platform 102 may detect parameters similar to those described above at step 202. However, rather than corresponding to historical data, the parameters detected at step 204 may be current or otherwise real time data.

Figure 2B:
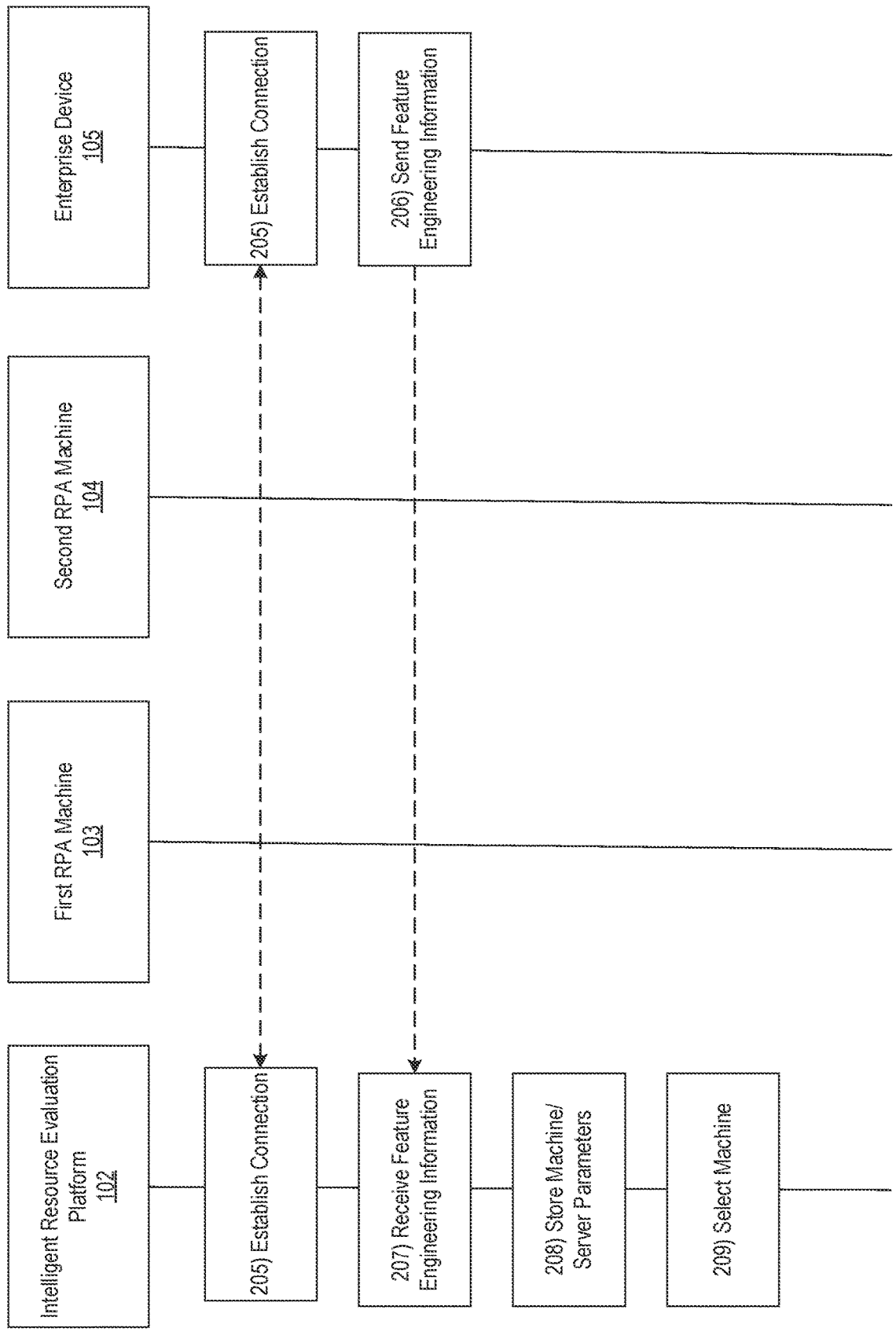

Referring to FIG. 2B, at step 205, the enterprise device 105 may establish a connection with the intelligent resource evaluation platform 102. For example, the enterprise device 105 may establish a third wireless data connection with the intelligent resource evaluation platform 102 to link the enterprise device 105 with the intelligent resource evaluation platform 102 (e.g., in preparation for sending feature engineering information). In some instances, the enterprise device 105 may identify whether a connection is already established with the intelligent resource evaluation platform 102. If a connection is already established with the intelligent resource evaluation platform 102, the enterprise device 105 might not re-establish the connection. Otherwise if the connection is not yet established with the intelligent resource evaluation platform 102, the enterprise device 105 may establish the third wireless data connection as described herein.

At step 206, the enterprise device 105 may send feature engineering information to the intelligent resource evaluation platform 102. For example, the enterprise device 105 may send information indicating a subset of parameters to be considered in identifying a suitable machine/server, which may, for example, have the largest impact (when compared to the remaining parameters) on whether or not the server/machine is sufficient to execute a robotic process automation. In some instances, the feature engineering information may indicate general policies (e.g., universal to all robotic process automations). In other instances, the feature engineering information may indicate specific policies for various robotic process automations. In some instances, the enterprise device 105 may send the feature engineering information to the intelligent resource evaluation platform 102 while the third wireless data connection is established.

At step 207, the intelligent resource evaluation platform 102 may receive feature engineering information sent at step 206. For example, the intelligence resource evaluation platform 102 may receive the feature engineering information via the communication interface 113 and while the third wireless data connection is established.

Although steps 206 and 207 describe manual feature engineering based on input from the enterprise device 105, in some instances, the intelligent resource evaluation platform 102 may perform automated feature engineering. Additionally, although the feature engineering is described at steps 206/207, it may, in some instances, be part of training the intelligent resource evaluation model at step 203.

At step 208, the intelligent resource evaluation platform 102 may store the current machine/server parameters received at step 204, based on the feature engineering information. For example, the intelligent resource evaluation platform may store current parameters indicated in the feature engineering information, and might not store the remaining current parameters.

In some instances, in storing the current machine/server parameters, the intelligent resource evaluation platform 102 may use key value pairs. For example, the intelligent resource evaluation platform 102 may store a key corresponding to each machine/server, which may define each unique row of a database. Each column of the database may correspond to a particular parameter. The parameters for each machine/server may then be stored in the corresponding column and unique row as values for the corresponding key. In some instances, this may improve processing efficiency, as the various parameters for a given system/machine may be quickly identified merely by identifying the corresponding key and its values in the table. Similarly, such a storage method may conserve memory, which may, e.g., further improve processing speed.

At step 209, the intelligent resource evaluation platform 102 may select a machine to perform a robotic automation process. In some instances, such selection may be random, location based, activity based, and/or otherwise performed.

Referring to FIG. 2C, at step 210, the intelligent resource evaluation platform 102 may identify current machine/server parameters from the database. For example, the intelligent resource evaluation platform 102 may identify a key corresponding to the selected machine (e.g., by indexing an identifier for the selected machine), and may identify the corresponding key values (which are the current corresponding parameters).

At step 211, the intelligent resource evaluation platform 102 may input the current parameters for the selected machine, identified at step 210, into the intelligent resource evaluation platform 102. The intelligent resource evaluation model may analyze the current parameters as described above at step 203 with regard to training of the model. For example, the intelligent resource evaluation platform 102 may compare each of the identified current parameters to a corresponding threshold value for the respective parameters. In some instances, these threshold values may be specific to the specific robotic process automation to be executed. As described at step 203, in some instances, a holistic analysis of the current parameters may be performed, which may, e.g., be a weighted or unweighted analysis process. Alternatively, if any of the comparisons of the respective current parameters to their corresponding threshold values indicate insufficiency of the first RPA machine 103 to execute the robotic process automation, a result of insufficient may be output.

As a result of the analysis, the intelligent resource evaluation model may output a machine selection information indicating a determination of "sufficient" or "insufficient." If the intelligent resource evaluation model outputs "sufficient" (e.g., for the first RPA machine 103), the intelligent resource evaluation platform 102 may proceed to step 212. Otherwise, if the intelligent resource evaluation model outputs "insufficient," the intelligent resource evaluation platform 102 may return to step 209 to select a backup machine (e.g., second RPA machine 104), and may repeat the above described analysis for this backup machine. In these instances, the above described machine selection and analysis process may be repeated until a suitable RPA machine is identified (which may, e.g., in some instances, take more than two iterations).

At step 212, the intelligent resource evaluation platform 102 may send one or more commands directing the first RPA machine 103 to execute the robotic process automation. For example, the intelligent resource evaluation platform 102 may send the one or more commands directing the first RPA machine 103 to execute the robotic process automation via the communication interface and while the first wireless data connection is established.

At step 213, the first RPA machine 103 may receive the one or more commands directing the first RPA machine 103 to execute the robotic process automation. For example, the first RPA machine 103 may receive the one or more commands directing the first RPA machine 103 to execute the robotic process automation while the first wireless data connection is established.

At step 214, based on or in response to the one or more commands directing the first RPA machine 103 to execute the robotic process automation, the first RPA machine 103 may initiate the robotic process automation.

Figure 2D:
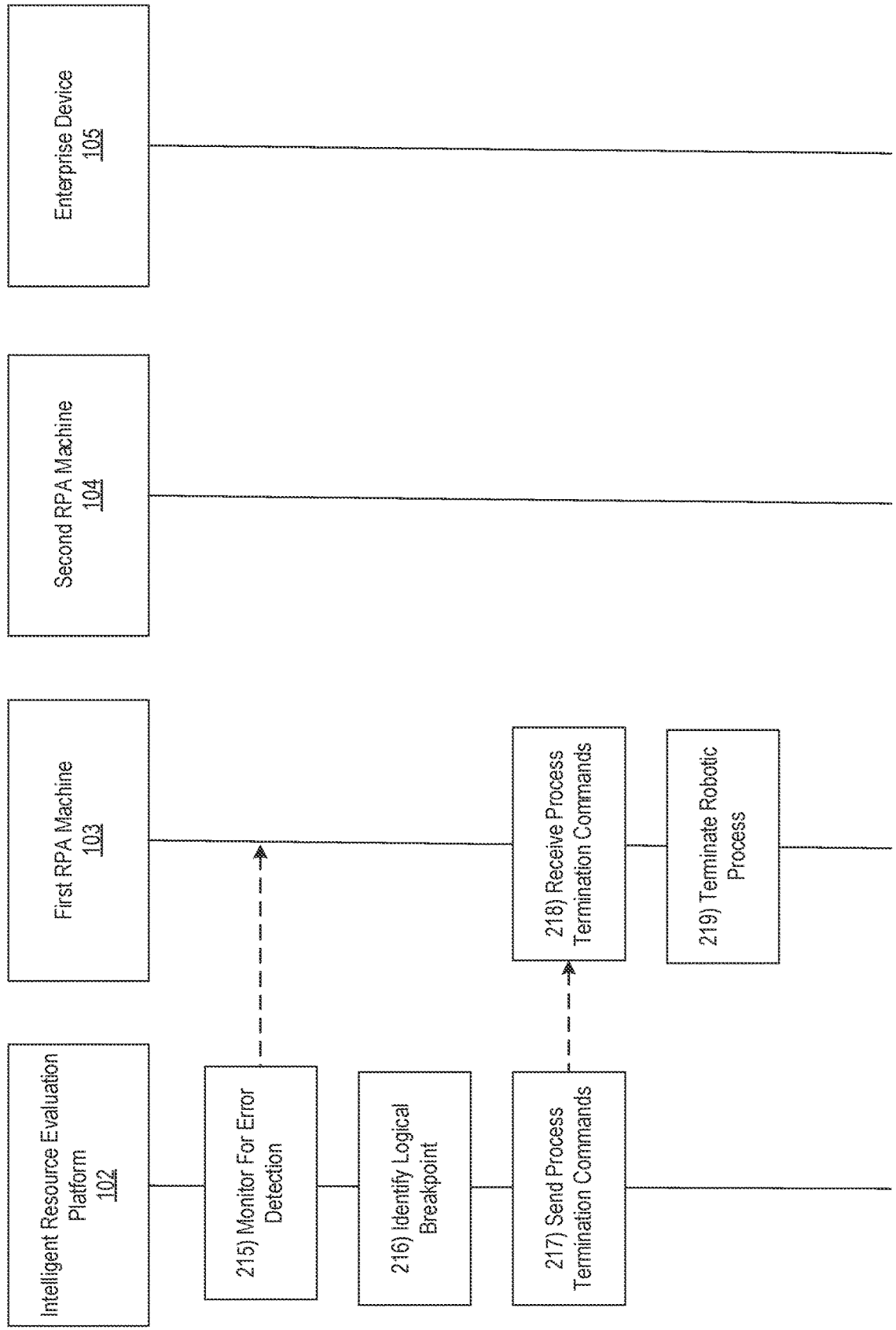

Referring to FIG. 2D, at step 215, the intelligent resource evaluation platform 102 may monitor the first RPA machine 103 to detect whether any errors occur in the robotic process automation. If the robotic process automation completes without any errors, the intelligent resource evaluation platform 102 may proceed to step 223. Otherwise, if an error is detected, the intelligent resource evaluation platform 102 may proceed to step 216.

At step 216, the intelligent resource evaluation platform 102 may identify a logical breakpoint for the robotic process automation. For example, the intelligent resource evaluation platform 102 may have previously analyzed database and/or runtime logs for various robotic process automations to identify logical stopping points once errors are detected.

As a particular example, the robotic process automation may be a process for automated account creation of 1000 accounts. In this example, each account creation process may proceed through ten pages. While executing, an error may occur on page 4 in the creation of account 500. In this instance, the intelligent resource evaluation platform 102 may identify that the logical breakpoint is after creation of account 500 (e.g., so as not to initiate the creation of any new accounts until the error is resolved). Once the intelligent resource evaluation platform 102 identifies that the logical breakpoint has been reached, it may proceed to step 217.

At step 217, after identifying that the logical breakpoint has been reached, the intelligent resource evaluation platform 102 may send one or more commands directing the first RPA machine 103 to terminate the robotic process automation. For example, the intelligent resource evaluation platform 102 may send the process termination commands to the first RPA machine 103 via the communication interface 113 and while the first wireless data connection is established.

At step 218, the first RPA machine 103 may receive the one or more commands directing the first RPA machine 103 to terminate the robotic process automation. For example, the first RPA machine 103 may receive the one or more commands directing the first RPA machine 103 to terminate the robotic process automation while the first wireless data connection is established. At step 219, based on or in response to the one or more commands directing the first RPA machine 103 to terminate the robotic process automation, the first RPA machine 103 may terminate the robotic process automation.

Figure 2E:
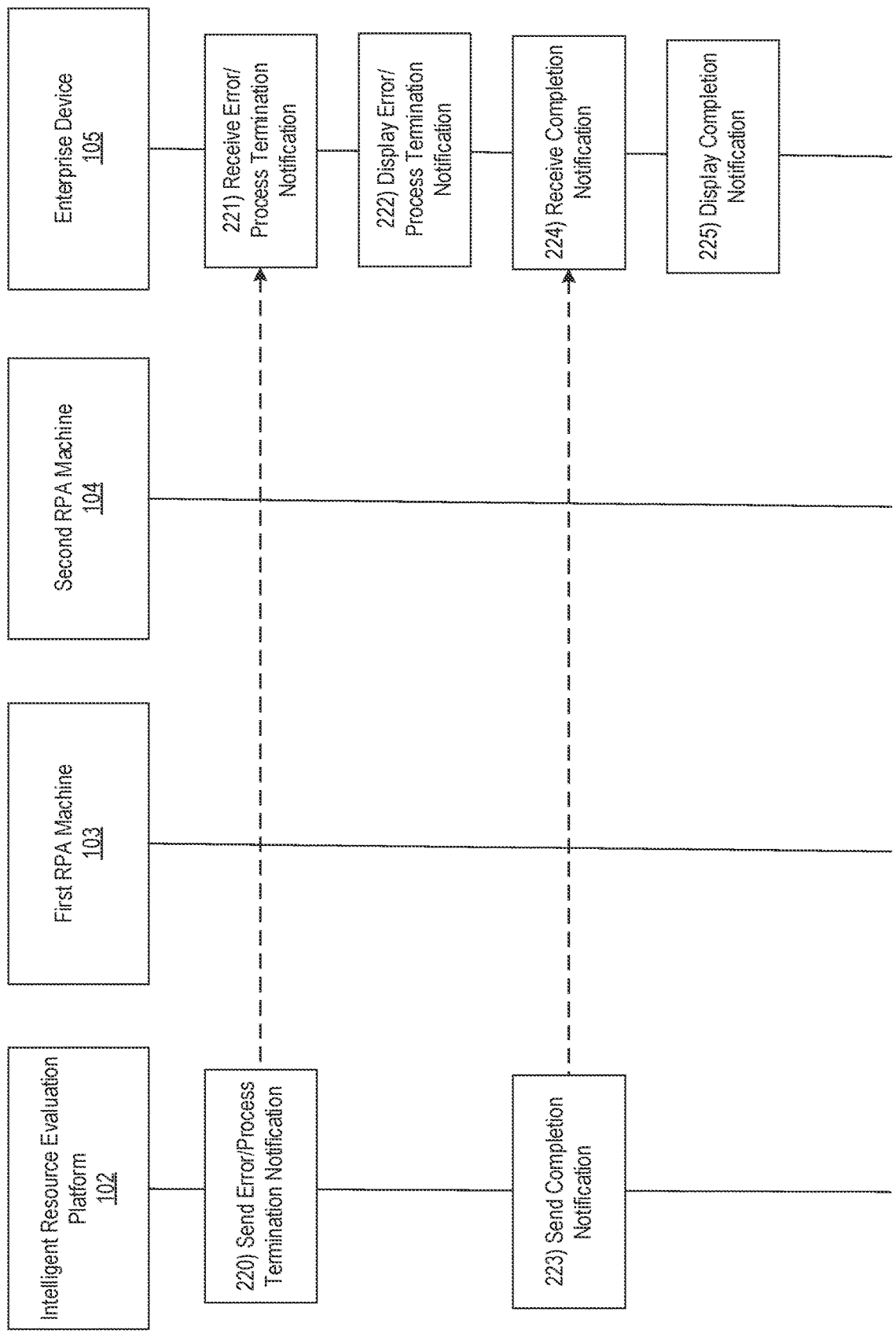

Referring to FIG. 2E, at step 220, the intelligent resource evaluation platform 102 may send an error/process termination notification to the enterprise device 105. For example, the intelligent resource evaluation platform 102 may send the error/process termination notification to the enterprise device 105 via the communication interface 113 and while the third wireless data connection is established. In some instances, the intelligent resource evaluation platform 102 may also send one or more commands directing the enterprise device 105 to display the error/process termination notification.

At step 221, the enterprise device 105 may receive the error/process termination notification sent at step 220. For example, the enterprise device 105 may receive the error/process termination notification while the third wireless data connection is established. In some instances, the enterprise device 105 may also receive one or more commands directing the enterprise device 105 to display the error/process termination notification.

Figure 4:
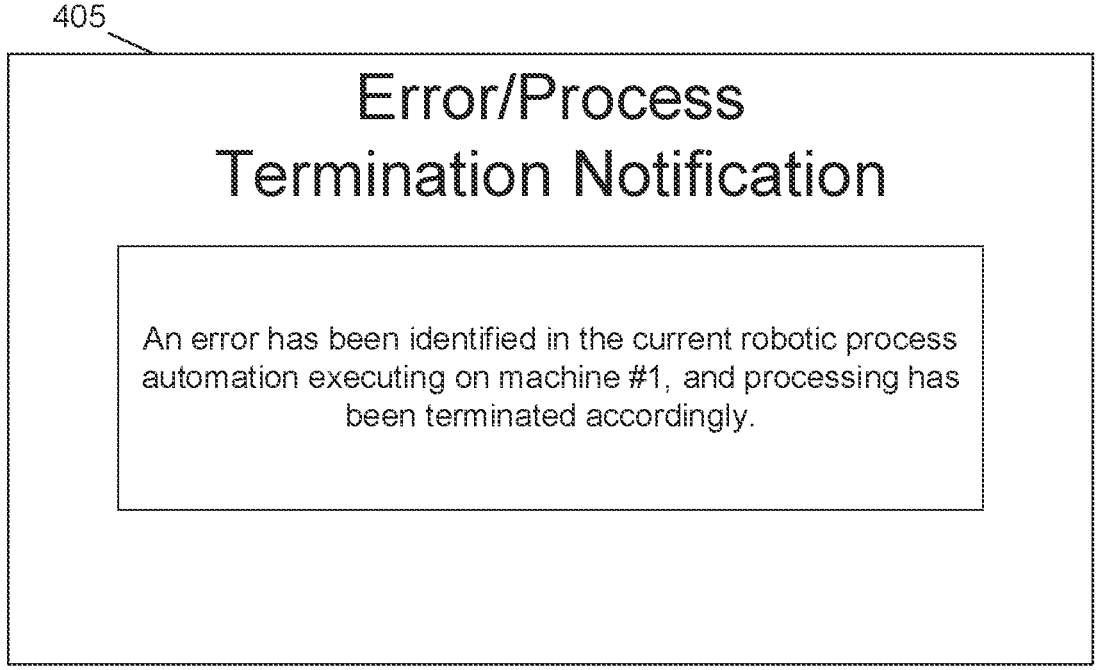
FIGS. 4 and 5 depict illustrative graphical user interfaces for intelligent resource evaluation for robotic process automations in accordance with one or more example embodiments.

At step 222, based on or in response to the one or more commands directing the enterprise device 105 to display the error/process termination notification, the enterprise device 105 may display the error/process termination notification. For example, the enterprise device 105 may display a graphical user interface similar to graphical user interface 405, which is shown in FIG. 4.

At step 223, the intelligent resource evaluation platform 102 may send a completion notification. For example, the intelligent resource evaluation platform 102 may send a completion notification via the communication interface 113 and while the third wireless data connection is established. In some instances, the intelligent resource evaluation platform 102 may also send one or more commands directing the enterprise device 105 to display the completion notification.

At step 224, the enterprise device 105 may receive the completion notification sent at step 223. For example, the enterprise device 105 may receive the completion notification while the third wireless data connection is established. In some instances, the enterprise device 105 may also receive the one or more commands directing the enterprise device 105 to display the completion notification.

Figure 5:
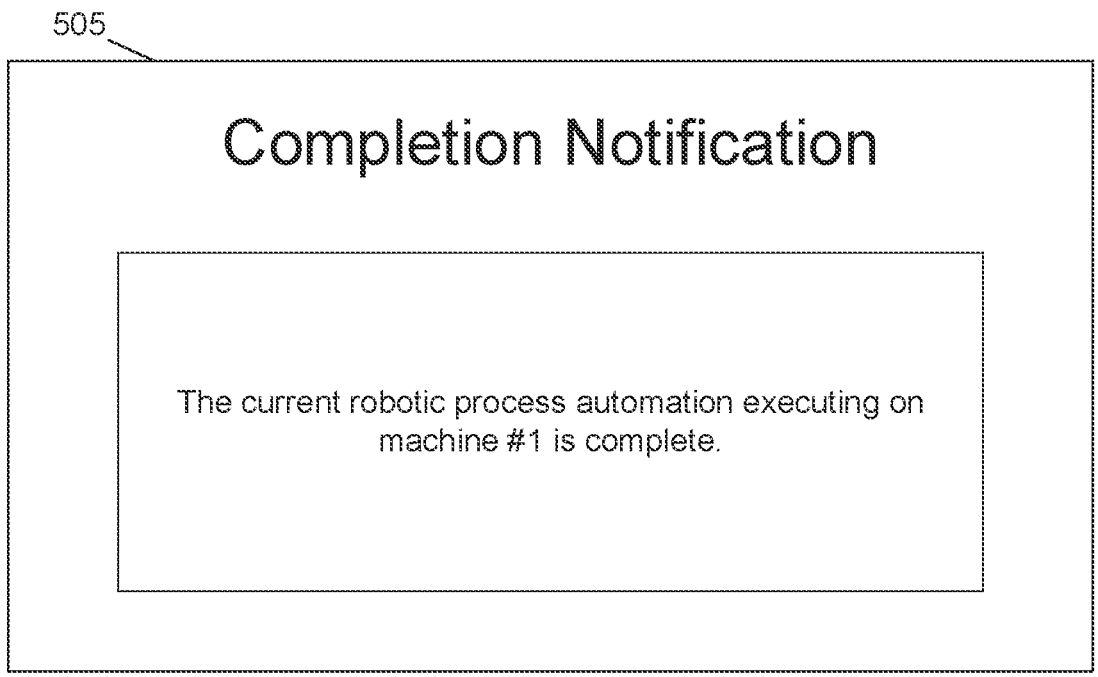

At step 225, based on or in response to the one or more commands directing the enterprise device 105 to display the completion notification, the enterprise device 105 may display the completion notification. For example, the enterprise device 105 may display a graphical user interface similar to graphical user interface 505, which is shown in FIG. 5.

Referring to FIG. 2F, at step 226, the intelligent resource evaluation platform 102 may dynamically update/refine the intelligent resource evaluation model based on the outputs of the model produced at step 211 as well as any error information. For example, the intelligent resource evaluation platform 102 may establish a dynamic feedback loop so as to continuously train the intelligent resource evaluation model based on any newly processed information, the corresponding outputs, and/or any error information to improve accuracy of the model. As a particular example, if the intelligent resource evaluation model identified that the first RPA machine 103 was sufficient to execute the robotic process automation, but an error occurred due to CPU overload, the intelligent resource evaluation model may modify the threshold corresponding to CPU utilization (e.g., reduce the threshold). The intelligent resource evaluation model may then compare future parameters to this reduced threshold, and only classify a machine as sufficient if the CPU utilization is below the reduced threshold, thus reducing likelihood of future error. Additionally or alternatively, the intelligent resource evaluation model may update any weighting of the various parameters.

In some instances, the method described above may be performed using any number of machines or other devices, and may be performed for any number of bots/robotic process automations without departing from the scope of the disclosure.

Figure 3:
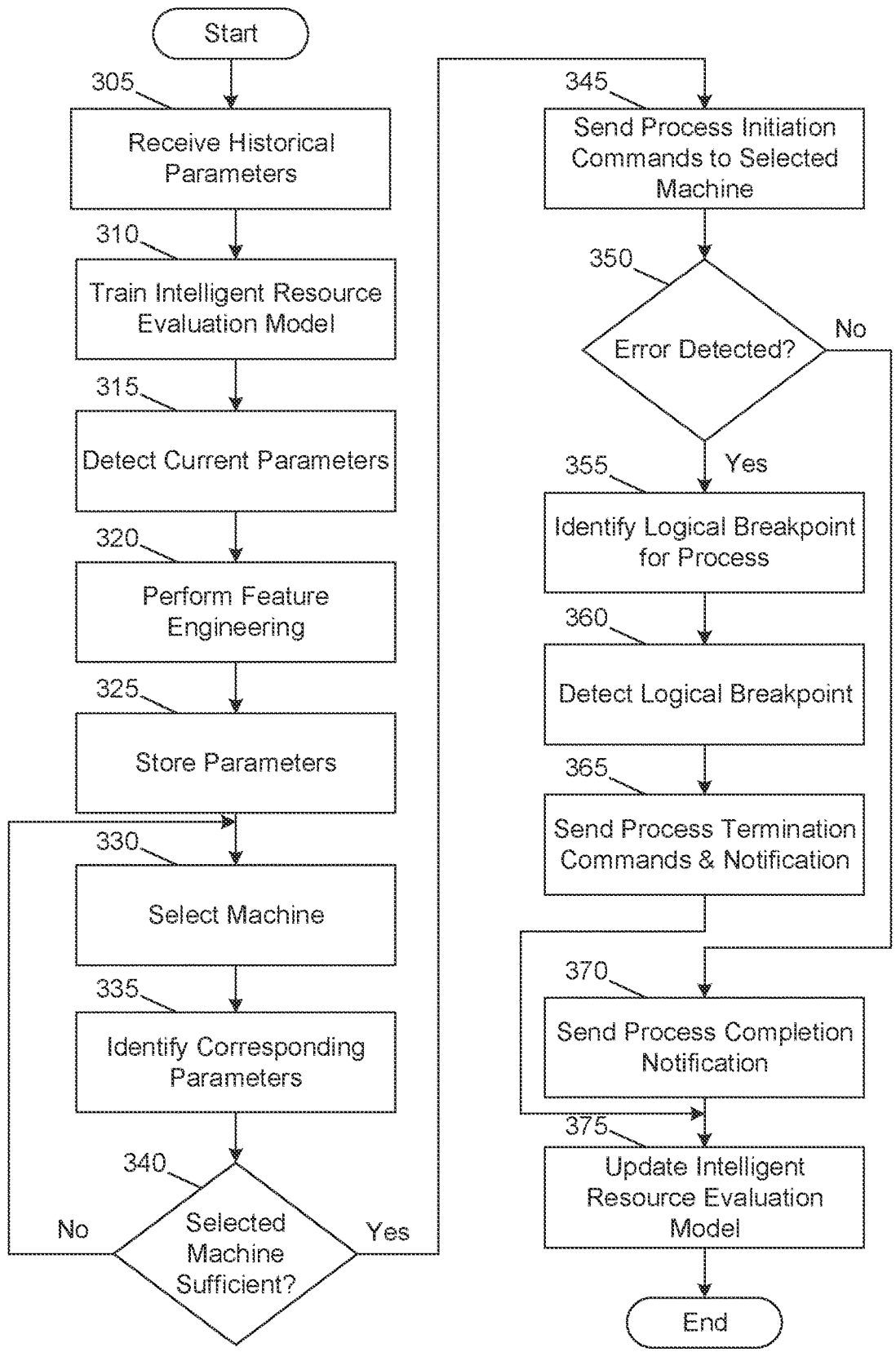
FIG. 3 depicts an illustrative method for intelligent resource evaluation for robotic process automations in accordance with one or more example embodiments.

FIG. 3 depicts an illustrative method for intelligent resource evaluation for robotic process automations in accordance with one or more example embodiments. Referring to FIG. 3, at step 305, a computing platform having at least one processor, a communication interface, and memory may receive historical parameters. At step 310, the computing platform may train an intelligent resource evaluation model based on the historical parameters. At step 315, the computing platform may detect current parameters. At step 320, the computing platform may perform feature engineering. At step 325, the computing platform may store the current parameters based on the feature engineering and using key value pairs in a database. At step 330, the computing platform may select a machine to perform a robotic process automation. At step 335, the computing platform may identify corresponding parameters for the selected machine. At step 340, the computing platform may input the corresponding parameters into the intelligent resource evaluation model to output whether or not the selected machine is sufficient to execute the robotic process automation. If the selected machine is not sufficient, the computing platform may return to step 330 to select a backup machine. If the selected machine is sufficient, the computing platform may proceed to step 345.

At step 345, the computing platform may send one or more process initiation commands to the selected machine. At step 350, the computing platform may monitor execution of the robotic process automation at the selected machine to detect any errors. If an error is not detected before completion of the robotic process automation, the computing platform may proceed to step 370. Otherwise, if an error is detected before completion of the robotic process automation, the computing platform may proceed to step 355.

At step 355, the computing platform may identify a logical breakpoint for the robotic process automation. At step 360, the computing platform may detect occurrence of the identified logical breakpoint. At step 365, the computing platform may send a process termination notification to an enterprise device, and process termination commands to the selected machine. At step 370, the computing platform may send a process completion notification to the enterprise device. At step 375, the computing platform may update the intelligent resource evaluation model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the processor, cause the computing platform to:
train, using historical parameter information corresponding to a plurality of robotic process automation (RPA) machines and corresponding servers, an intelligent resource evaluation model, wherein training the intelligent resource evaluation model configures the intelligent resource evaluation model to output machine selection information indicating whether a given RPA machine is sufficient or insufficient for executing a given process automation;
monitor the plurality of RPA machines to detect current parameter information;
store the current parameter information along with the corresponding RPA machines as a key value pairs in a database;
identify a first RPA machine for use in executing a first robotic automation process;
identify first current parameter information for the first RPA machine using the key value pairs;
input the first current parameter information into the intelligent resource evaluation model, wherein inputting the first current parameter information into the intelligent resource evaluation model causes the intelligent resource evaluation model to output first machine selection information for the first RPA machine;
based on identifying that the first RPA machine is sufficient to execute the first robotic automation process, send one or more commands directing the first RPA machine to execute the first robotic automation process, wherein sending the one or more commands directing the first RPA machine to execute the first robotic automation process causes the first RPA machine to execute the first robotic automation process; and
based on identifying an error during execution of the first robotic automation process, send one or more commands directing the first RPA machine to terminate the first robotic automation process, wherein sending the one or more commands directing the first RPA machine to terminate the first robotic automation process causes the first RPA machine to terminate the first robotic automation process, wherein terminating the first robotic automation process comprises terminating, at a logical breakpoint indicated in the one or more commands directing the first RPA machine to terminate the first robotic automation process, the first robotic automation process.

2. The computing platform of claim 1, wherein training the intelligent resource evaluation model comprises:
labelling historical server and machine parameters to indicate whether or not various robotic automation processes have successfully executed when the corresponding parameters are present, wherein labelling the historical server and machine parameters results in the historical parameter information.

3. The computing platform of claim 1, wherein the historical parameter information and the current parameter information includes one or more of: server parameter information or machine parameter information, wherein:
the server parameter information comprises one or more of: server availability, environmental information, database information, connectivity issues, server performance, and application programming interface (API) connects, and
the machine parameter information comprises one or more of: machine identifiers, computer processing unit (CPU) utilization, response time, network latency, memory utilization, and background processes.

4. The computing platform of claim 1, wherein storing the current parameter information along with the corresponding RPA machines as the key value pairs in the database comprises:
defining each RPA machine and each server as a key;
storing each key in a unique row of the database; and
storing, in the unique rows for each key, the current parameter information for the corresponding RPA machine or server, wherein each column of the database corresponds to a type of parameter information, and wherein each value of the current parameter information is uniquely stored based on: 1) its corresponding type of parameter information, and 2) its corresponding RPA machine or server.

5. The computing platform of claim 1, wherein training the intelligent resource evaluation model causes the intelligent resource evaluation model to establish, for each of a plurality of parameter types and each of a plurality of process automations, a selection threshold, wherein a machine is deemed insufficient for a given process automation if a corresponding parameter value falls below the selection threshold for the given process automation.

6. The computing platform of claim 1, wherein identifying the first current parameter information for the first RPA machine using the key value pairs comprises:
 indexing an identifier for the first RPA machine to identify the corresponding key, and
 identifying, based on a row of the database for the corresponding key, the first current parameter information.

7. The computing platform of claim 1, wherein the memory stores additional computer-readable instructions that, when executed by the at least one processor, cause the computing platform to:
 identify, based on process logs for the first robotic automation process, the logical breakpoint.

8. The computing platform of claim 1, wherein storing the current parameter information along with the corresponding RPA machines comprises:
 performing a feature engineering process to identify one or more information types of the current parameter information to be input into the intelligent resource evaluation model, and
 storing a portion of the current parameter information corresponding to the identified one or more information types.

9. The computing platform of claim 1, wherein the memory stores additional computer-readable instructions that, when executed by the at least one processor, cause the computing platform to:
 based on identifying that the first RPA machine is not sufficient to execute the first robotic automation process, identify a second RPA machine for use in executing the first robotic automation process.

10. A method comprising:
 at a computing platform comprising at least one processor, a communication interface, and memory:
  training, using historical parameter information corresponding to a plurality of robotic process automation (RPA) machines and corresponding servers, an intelligent resource evaluation model, wherein training the intelligent resource evaluation model configures the intelligent resource evaluation model to output machine selection information indicating whether a given RPA machine is sufficient or insufficient for executing a given process automation;
  monitoring the plurality of RPA machines to detect current parameter information;
  storing the current parameter information along with the corresponding RPA machines as a key value pairs in a database;
  identifying a first RPA machine for use in executing a first robotic automation process;
  identifying first current parameter information for the first RPA machine using the key value pairs;
  inputting the first current parameter information into the intelligent resource evaluation model, wherein inputting the first current parameter information into the intelligent resource evaluation model causes the intelligent resource evaluation model to output first machine selection information for the first RPA machine;
  based on identifying that the first RPA machine is sufficient to execute the first robotic automation process, sending one or more commands directing the first RPA machine to execute the first robotic automation process, wherein sending the one or more commands directing the first RPA machine to execute the first robotic automation process causes the first RPA machine to execute the first robotic automation process; and
  based on identifying an error during execution of the first robotic automation process, sending one or more commands directing the first RPA machine to terminate the first robotic automation process, wherein sending the one or more commands directing the first RPA machine to terminate the first robotic automation process causes the first RPA machine to terminate the first robotic automation process, wherein terminating the first robotic automation process comprises terminating, at a logical breakpoint indicated in the one or more commands directing the first RPA machine to terminate the first robotic automation process, the first robotic automation process.

11. The method of claim 10, wherein training the intelligent resource evaluation model comprises:
 labelling historical server and machine parameters to indicate whether or not various robotic automation processes have successfully executed when the corresponding parameters are present, wherein labelling the historical server and machine parameters results in the historical parameter information.

12. The method of claim 10, wherein the historical parameter information and the current parameter information includes one or more of: server parameter information or machine parameter information, wherein:
 the server parameter information comprises one or more of: server availability, environmental information, database information, connectivity issues, server performance, and application programming interface (API) connects, and
 the machine parameter information comprises one or more of: machine identifiers, computer processing unit (CPU) utilization, response time, network latency, memory utilization, and background processes.

13. The method of claim 10, wherein storing the current parameter information along with the corresponding RPA machines as the key value pairs in the database comprises:
 defining each RPA machine and each server as a key;
 storing each key in a unique row of the database; and
 storing, in the unique rows for each key, the current parameter information for the corresponding RPA machine or server, wherein each column of the database corresponds to a type of parameter information, and wherein each value of the current parameter information is uniquely stored based on: 1) its corresponding type of parameter information, and 2) its corresponding RPA machine or server.

14. The method of claim 10, wherein training the intelligent resource evaluation model causes the intelligent resource evaluation model to establish, for each of a plurality of parameter types and each of a plurality of process automations, a selection threshold, wherein a machine is deemed insufficient for a given process automation if a corresponding parameter value falls below the selection threshold for the given process automation.

15. The method of claim 10, wherein identifying the first current parameter information for the first RPA machine using the key value pairs comprises:
 indexing an identifier for the first RPA machine to identify the corresponding key, and
 identifying, based on a row of the database for the corresponding key, the first current parameter information.

16. One or more non-transitory computer-readable media storing instructions that, when executed by a computing platform comprising at least one processor, a communication interface, and memory, cause the computing platform to:
- train, using historical parameter information corresponding to a plurality of robotic process automation (RPA) machines and corresponding servers, an intelligent resource evaluation model, wherein training the intelligent resource evaluation model configures the intelligent resource evaluation model to output machine selection information indicating whether a given RPA machine is sufficient or insufficient for executing a given process automation;
- monitor the plurality of RPA machines to detect current parameter information;
- store the current parameter information along with the corresponding RPA machines as a key value pairs in a database;
- identify a first RPA machine for use in executing a first robotic automation process;
- identify first current parameter information for the first RPA machine using the key value pairs;
- input the first current parameter information into the intelligent resource evaluation model, wherein inputting the first current parameter information into the intelligent resource evaluation model causes the intelligent resource evaluation model to output first machine selection information for the first RPA machine;
- based on identifying that the first RPA machine is sufficient to execute the first robotic automation process, send one or more commands directing the first RPA machine to execute the first robotic automation process, wherein sending the one or more commands directing the first RPA machine to execute the first robotic automation process causes the first RPA machine to execute the first robotic automation process; and
- based on identifying an error during execution of the first robotic automation process, send one or more commands directing the first RPA machine to terminate the first robotic automation process, wherein sending the one or more commands directing the first RPA machine to terminate the first robotic automation process causes the first RPA machine to terminate the first robotic automation process, wherein terminating the first robotic automation process comprises terminating, at a logical breakpoint indicated in the one or more commands directing the first RPA machine to terminate the first robotic automation process, the first robotic automation process.

* * * * *